(12) United States Patent
Lu et al.

(10) Patent No.: US 9,990,074 B2
(45) Date of Patent: Jun. 5, 2018

(54) DRIVING CIRCUIT FOR TOUCH SCREEN, TOUCH SCREEN, AND ELECTRONIC TERMINAL

(71) Applicant: Shenzhen China Star Optoelectronics Technology Co., Ltd., Shenzhen, Guangdong (CN)

(72) Inventors: Yucheng Lu, Guangdong (CN); Xiaoping Tan, Guangdong (CN); Xiang Yang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 100 days.

(21) Appl. No.: 14/418,625

(22) PCT Filed: Jan. 20, 2015

(86) PCT No.: PCT/CN2015/071118
§ 371 (c)(1),
(2) Date: May 10, 2016

(87) PCT Pub. No.: WO2016/106886
PCT Pub. Date: Jul. 7, 2016

(65) Prior Publication Data
US 2016/0246428 A1    Aug. 25, 2016

(30) Foreign Application Priority Data

Dec. 31, 2014    (CN) .......................... 2014 1 0856598

(51) Int. Cl.
*G06F 3/041*    (2006.01)
*G06F 3/044*    (2006.01)
*G09G 3/36*    (2006.01)

(52) U.S. Cl.
CPC ............ *G06F 3/0416* (2013.01); *G06F 3/044* (2013.01); *G09G 3/36* (2013.01)

(58) Field of Classification Search
CPC ........ G06F 3/041; G06F 3/0416; G06F 3/044; G09G 3/36
See application file for complete search history.

(56) References Cited

U.S. PATENT DOCUMENTS

| | | | |
|---|---|---|---|
| 2012/0268397 A1* | 10/2012 | Lee .......................... | G06F 3/044 345/173 |
| 2014/0049509 A1* | 2/2014 | Shepelev ................ | G06F 3/044 345/174 |

(Continued)

FOREIGN PATENT DOCUMENTS

| | | |
|---|---|---|
| CN | 101943961 A | 1/2011 |
| CN | 102591511 A | 7/2012 |

(Continued)

OTHER PUBLICATIONS

International Search Report and Written Opinion, dated Jan. 20, 2015 China.

*Primary Examiner* — Abhishek Sarma
(74) *Attorney, Agent, or Firm* — Kim Winston LLP

(57) ABSTRACT

A driving circuit for touch screen, a touch screen, and an electronic terminal are disclosure. The driving circuit for touch screen comprises: a control circuit, used for generating and outputting a scanning signal and a data selection signal according to a position of an electrode to be driven; and a data selection circuit, an input end thereof being connected with said control circuit, output ends thereof each being connected with a corresponding scanning end of the touch screen, wherein the data selection circuit is configured to turn on or turn off a connection between an input end thereof and an output end corresponding to the electrode to be driven according to said data selection signal. In the driving (Continued)

circuit, the influence on the following detection of the touch points generated by the attenuation of the scanning signal during transmission process can be reduced effectively, so that the reliability and accuracy of the detection result can be ensured.

13 Claims, 2 Drawing Sheets

(56) References Cited

U.S. PATENT DOCUMENTS

| | | | | |
|---|---|---|---|---|
| 2014/0139480 A1* | 5/2014 | Seo | ............... | G06F 3/044 345/174 |
| 2014/0292708 A1 | 10/2014 | Kwon et al. | | |
| 2015/0116267 A1* | 4/2015 | Inoue | ............... | G06F 3/0416 345/174 |
| 2017/0031517 A1* | 2/2017 | Zhao | ............... | G06F 3/041 |

FOREIGN PATENT DOCUMENTS

| | | |
|---|---|---|
| CN | 103823587 A | 5/2014 |
| CN | 104102405 A | 10/2014 |

\* cited by examiner

DRIVING CIRCUIT FOR TOUCH SCREEN, TOUCH SCREEN, AND ELECTRONIC TERMINAL

CROSS REFERENCE TO RELATED APPLICATION

The present application claims benefit of Chinese patent application CN 201410856598.4, entitled "Driving Circuit for Touch Screen, Touch Screen, and Electronic Terminal" and filed on Dec. 31, 2014, which is incorporated herein by reference.

FIELD OF THE INVENTION

The present disclosure relates to the technical field of touch screen, and particularly to a driving circuit for touch screen, a touch screen, and an electronic terminal.

BACKGROUND OF THE INVENTION

Since the advent of computer, people have been researching how to realize man-machine interaction in a more effective manner, i.e., man-machine interaction technology. The capacitive touch technology has improved the efficiency and convenience of man-machine interaction to a large extent by virtue of its advantages of direct, high-efficient, accurate, fluent, fashion and the like.

The projective capacitive screen comprises self-capacitor screen and mutual capacitor screen. The electrode array (which is made of Indium Tin Oxide, i.e., ITO, a transparent material) arranged in a horizontal direction and a vertical direction in a staggered manner can be manufactured on a surface of a glass substrate, and the horizontal electrodes and vertical electrodes constitute capacitors with the ground respectively. This kind of capacitor is a self-capacitor, i.e., the capacitor formed by the electrode and the ground. When a finger touches the capacitive screen, a capacitance of the finger would be added to the capacitance of the screen, and thus the capacitance of the screen would be increased.

When the touch detection is performed, in the self-capacitor screen, the horizontal electrode array and the vertical electrode array are detected in sequence. The horizontal ordinate and the vertical ordinate of the changed capacitor can be determined respectively according to the change of the capacitor before and after touch. Then, the coordinate values of the touch point of the touch screen can be obtained according to the horizontal ordinate and the vertical ordinate of the changed capacitor. According to the self-capacitor scanning mode, the touch point of the touch screen are projected to the X-axis and the Y-axis of a coordinate system respectively, then the coordinate value in the X-axis and the coordinate value in the Y-axis are calculated respectively, and at last the coordinate values of the touch point can be obtained.

If it is single point touch, the projection of the touch point in the X-axis is unique, and the projection thereof in the Y-axis is unique as well. Therefore, the coordinate value of the touch point is unique. However, if there are two touch points in the touch screen, and the two touch points are not located in the same direction along the X-axis or the same direction along the Y-axis, the two touch points have two projections along the X-axis and along the Y-axis respectively. In this case, the coordinate values of four points can be obtained. It is obvious that, only two points in the four points are real, and the other two unreal points are usually referred to as "ghost points." Consequently, the multi point touch cannot be realized in a self-capacitor screen.

In a mutual capacitor screen, the horizontal electrodes and vertical electrodes (which are made of ITO) are manufactured on the surface of the glass substrate as well. The difference from the self-capacitor screen lies in that, in the mutual capacitor screen, a capacitor would be formed at each of intersection positions of the two groups of electrodes. That is, the two groups of electrodes constitute the two plates of the capacitor respectively. When a finger touches the capacitive screen, the coupling between the two electrodes near the touch point would be affected, and thus the capacitance between the two electrodes would be changed.

When the capacitance of a mutual capacitor is detected, the horizontal electrodes emit scanning signals in sequence. With respect to the scanning signal emitted by each horizontal electrode, all vertical electrodes can receive a corresponding response signal at the same time. In this case, the capacitances of the intersection points of all horizontal electrodes and vertical electrodes, i.e., the capacitance of each detection point in the two-dimensional plane of the whole touch screen, can be obtained. The coordinate values of each touch point can be calculated according to the changing of the capacitance of each detection point in the two-dimensional plane of the touch screen. Therefore, in the mutual capacitor touch screen, the real coordinate values of each touch point can be correctly determined even if there is a plurality of touch points in the screen.

In the mutual capacitor screen, the horizontal electrodes and vertical electrodes can be considered to be arranged in rows and columns on the glass substrate. Since ITO and metal materials which constitute the electrodes all have a certain resistance, and there also exists influences of other factors in the structure, different degrees of attenuation would be generated during a process when the signal transmits between each horizontal electrode and a corresponding vertical electrode. The attenuation would interfere in the following touch detection and detection algorithm. Therefore, not only the complexity of the detection algorithm would be increased to a large extent, but also misdetection would possibly be resulted in.

SUMMARY OF THE INVENTION

The present disclosure aims to reduce the interference in the following touch detection generated by the attenuation of the scanning signal during transmission process. In order to solve the technical problem, the embodiment of the present disclosure firstly provides a driving circuit for a touch screen, comprising: a control circuit, used for generating and outputting a scanning signal and a data selection signal according to a position of an electrode to be driven; and a data selection circuit, an input end thereof being connected with said control circuit, output ends thereof each being connected with a corresponding scanning end of the touch screen. The data selection circuit is used for turning on or turning off a connection between an input end thereof and an output end corresponding to the electrode to be driven according to said data selection signal, so as to drive said electrode to be driven through said scanning signal.

According to one embodiment of the present disclosure, the larger the distance between said electrode to be driven and a test end of a liquid crystal screen is, the larger the value of the scanning signal output by said control circuit would become.

According to one embodiment of the present disclosure, said control circuit comprises: a controller, used for generating and outputting a corresponding digital voltage signal and the data selection signal according to the position of the electrode to be driven; and a digital-analog converting circuit, connected with said controller, and used for converting a digital voltage signal output by said controller into an analog voltage signal so as to obtain the scanning signal.

According to one embodiment of the present disclosure, said control circuit further comprises a reference power circuit, connected with said digital-analog converting circuit and used for providing a reference voltage to said digital-analog converting circuit.

According to one embodiment of the present disclosure, said data selection circuit comprises a controllable switch, an input end for data signal thereof being connected with said digital-analog converting circuit, an input end for control signal thereof being connected with said controller, output ends thereof each being connected with a corresponding scanning end of the touch screen, wherein the controllable switch is used for turning on or turning off a connection between the input end for data signal and an output end corresponding to the electrode column to be driven according to said data selection signal.

According to one embodiment of the present disclosure, said data selection circuit further comprises an operational amplification circuit, connected between said digital-analog converting circuit and said controllable switch, and used for outputting the scanning signal to said controllable switch after operational amplification.

According to one embodiment of the present disclosure, said controllable switch comprises a Field Programmable Gate Array (FPGA).

According to one embodiment of the present disclosure, said controllable switch comprises a single-pole multi-throw switch.

The present disclosure further provides a touch screen, which comprises a driving circuit for the touch screen as mentioned in any one of the above items.

The present disclosure further provides an electronic terminal, which comprises the aforesaid touch screen.

According to the present disclosure, in the driving circuit for the touch screen, the scanning ends of the touch screen are not provided with the same scanning signals. However, the scanning ends are provided with different scanning signals according to the positional relationship between respective scanning ends and the test ends. In the driving circuit, the influence on the following detection of the touch points generated by the attenuation of the scanning signal during transmission can be reduced effectively, so that the reliability and accuracy of the detection result can be ensured. In addition, since in the driving circuit, the test ends output the same signal when the touch screen is not touched, the detection algorithm can be simplified and the efficiency of touch detection can be improved.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The drawings necessary for explaining the embodiments or the prior art are introduced briefly below to illustrate the technical solutions of the embodiments of the present disclosure or the prior art more clearly.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

Many specific details are illustrated hereinafter for providing a thorough understanding of the embodiments of the present disclosure. However, it is obvious for those skilled in the art that, the present disclosure can be implemented in other methods in addition to the details or specifics described herein.

Figure 1:
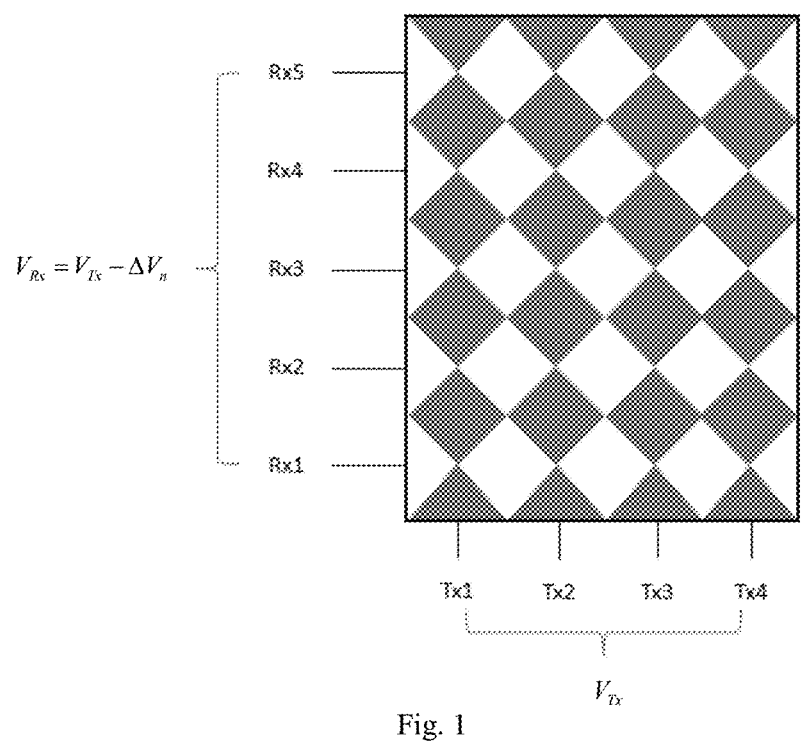
FIG. 1 schematically shows part of the arrangement of electrodes of a touch screen in the prior art.

FIG. 1 schematically shows the arrangement of electrodes of a touch screen in the prior art.

Taking a region of the touch screen as shown in FIG. 1 as an example, in a mutual capacitive touch screen, the capacitors are driven in a column-by-column scanning mode. That is, the scanning signals with the same amplitude and the same frequency are applied to each of the scanning ends (i.e., the ends corresponding to exciting electrodes in each column, including an end $T_{x1}$, an end $T_2$, an end $T_{x3}$, and an end $T_{x4}$) in a column-by-column manner. Specifically, when the touch screen is driven, a preset voltage signal is firstly applied to a certain scanning end (i.e., the end corresponding to the electrodes in a certain column, for example the end $T_{x1}$), so that the mutual capacitors formed by the electrodes in the column and the response electrodes in each row (i.e., the electrodes connected with the test ends $R_{x1}$ to $R_{x5}$ respectively) can be charged. Then, the charges of the response electrodes in each row are detected. In the following, the same preset voltage signal is applied to the next scanning end, for example the end $T_{x2}$. The same steps are performed on other scanning ends in sequence. When a finger touches the screen, the value of the mutual capacitor at a touch position of the touch screen would be reduced, so that the touch position can be determined by the detecting circuit through detecting the change of the capacitance and after analysis.

It can be seen from FIG. 1 that, both the exciting electrodes and the response electrodes can be roughly considered to be arranged in rows and columns in the region as shown in FIG. 1. Since ITO and metal materials which constitute the electrodes all have a certain resistance, and there also exists the influences of other factors in the touch screen structure, different degrees of attenuation would be generated during the process when the scanning signals which are applied to different scanning ends (i.e., the scanning signals which are applied to the exciting electrodes in different columns) transmit to the response electrodes.

For example, it is assumed that the detecting circuit finally converts the signals detected from the test ends into voltage data and analyzes the voltage data. As shown in FIG. 1, when the touch screen is not touched, $\Delta V_1 < \Delta V_2 < \Delta V_3 < \Delta V_4$, wherein $\Delta V_1$, $\Delta V_2$, $\Delta V_3$, and $\Delta V_4$ represent the signal attenuation of the scanning signals which are applied to the scanning ends $T_{x1}$, $T_{x2}$, $T_{x3}$, and $T_{x4}$ after transmitting to the test ends respectively. It can be seen that, the larger the distance between the exciting electrode and the test end is, the larger the attenuation of the scanning signal which is applied to the exciting electrode during the transmission to the test end would become.

Figure 2:
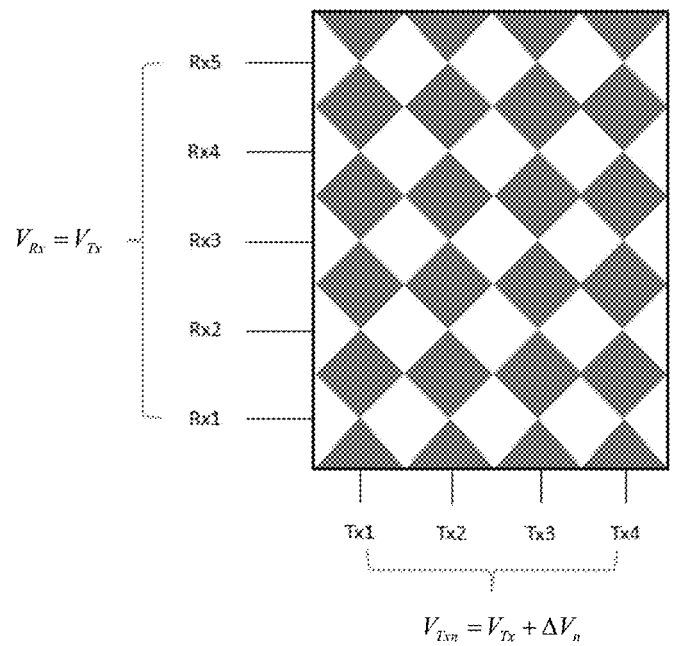
FIG. 2 schematically shows the principle on which the interference brought about by signal attenuation can be reduced according to one embodiment of the present disclosure.

In order to neutralize the signal attenuation and simplify the following touch point detection and anti-interference procedures, as shown in FIG. 2, according to the present embodiment, the scanning signals which are applied to the exciting electrodes are raised by an appropriate amount to compensate the attenuation generated during the transmission.

As shown in FIG. 2, when the scanning signal is applied to a certain scanning end (i.e., the exciting electrodes in a certain column), the exciting electrodes in the column are all applied with the scanning signal. Therefore, when the touch screen is not touched, the response signals measured from each of the test ends (i.e., the test ends $R_{x1}$ to $R_{x5}$) are the same as one another. It can be seen that, the difference of the signal attenuation is mainly dependent on the position of the exciting electrode. Since the exciting electrodes in a first column (i.e., the electrodes connected with the scanning end $T_{x1}$) are the nearest ones to the test ends, the attenuation of the signal measured from the test ends is the smallest when the scanning signal is applied to the exciting electrodes in the first column. The attenuation of the signal measured from the test ends would become larger as the distance between the exciting electrodes and the test ends increases.

Based on the above principle, as shown in FIG. 2, according to the present embodiment, the exciting electrodes in each column (i.e., each scanning end) are applied with different scanning signals according to the distance between the exciting electrodes and the test ends, so as to compensate the different degrees of attenuation of the scanning signals generated by different transmitting lines.

Specifically, when the touch screen is not touched, it is assumed that the voltage of the scanning signals which are applied to the exciting electrodes in each column in sequence is $V_{Tx}$, and the corresponding degrees of signal attenuation measured from the test ends are $\Delta V_1$, $\Delta V_2$, $\Delta V_3$, and $\Delta V_4$ respectively. In this case, the voltages of each of the response signals measured by the driving circuit in the prior art are $V_{Tx}-\Delta V_1$, $V_{Tx}-\Delta V_2$, $V_{Tx}-\Delta V_3$, and $V_{Tx}-\Delta V_4$ respectively. It can be seen that, when the electrodes of the touch screen are scanned in the case that the touch screen is not touched, the response signals measured therein are different from one another, which would apparently interfere in the following signal analysis and the operation of the detection algorithm.

In order to reduce the interference, according to the present embodiment, the scanning signals which are applied to each scanning end are regulated respectively. Specifically, the voltages of the scanning signals which are applied to the scanning ends $T_{x1}$ to $T_{x4}$ are $V_{Tx}+\Delta V_1$, $V_{Tx}+\Delta V_2$, $V_{Tx}+\Delta V_3$, and $V_{Tx}+\Delta V_4$ respectively. In this case, the voltages of the response signals measured from each of the test ends are all $V_{Tx}$. Therefore, when the touch screen is not touched, each test end can output the same response signal, and the interference in the following signal analysis and the operation of the detection algorithm brought about by different degrees of signal attenuation resulted from the difference of transmitting lines can be eliminated.

Figure 3:
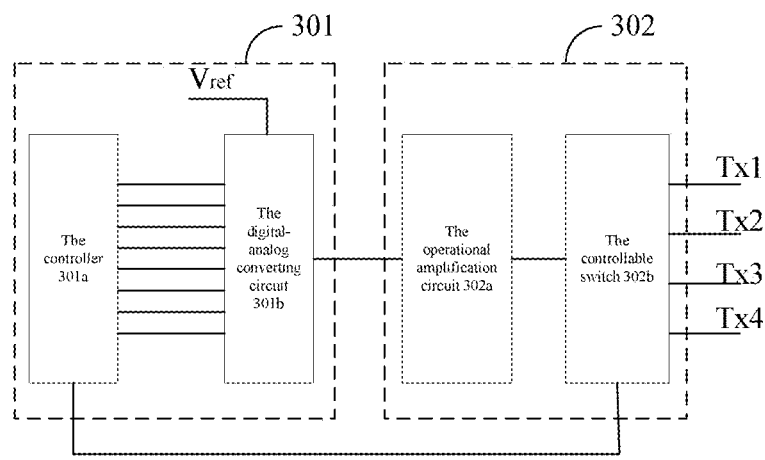
FIG. 3 is a circuit diagram of a driving circuit for a liquid crystal screen according to the embodiment of the present disclosure.

Based on the above principle, the present embodiment provides a new driving circuit for the touch screen. As shown in FIG. 3, the touch screen comprises a control circuit 301 and a data selection circuit 302. An input end of the data selection circuit 302 is connected with the control circuit 301, and output ends thereof are connected with a corresponding scanning end (i.e., the ends $T_{x1}$ to $T_{x4}$) of the touch screen respectively. According to the present embodiment, the control circuit 301 can generate and output a corresponding scanning signal and data selection signal according to the position of an electrode to be driven.

For example, if the exciting electrodes in the first column (i.e., the electrodes connected with the scanning end $T_{x1}$) need to be applied with the scanning signal, the control circuit 301 would generate a first scanning signal (the voltage thereof is $V_{Tx}+\Delta V_1$) and a first data selection signal. The data selection circuit 302 then turns on the connection between the control circuit 301 and the scanning end $T_{x1}$ according to the first data selection signal, so that the first scanning signal is applied to the exciting electrodes in the first column.

If the exciting electrodes in the second column (i.e., the electrodes connected with the scanning end $T_{x2}$) need to be applied with the scanning signal, the control circuit 301 would generate a second scanning signal (the voltage thereof is $V_{Tx}+\Delta V_2$) and a second data selection signal. The data selection circuit 302 then turns on the connection between the control circuit 301 and the scanning end $T_{x2}$ according to the second data selection signal, so that the second scanning signal is applied to the exciting electrodes in the second column. Similarly, the control circuit 301 generates different scanning signals and data selection signals according to the electrodes to be driven, and the data selection circuit 302 turns on the connection between the control circuit 301 and the corresponding scanning end according to the corresponding data selection signal, so that the scanning signal can be applied to the corresponding exciting electrodes.

According to the present embodiment, the control circuit 301 comprises a controller 301*a* and a digital-analog converting circuit 301*b*. The digital-analog converting circuit 301*b* is connected between the controller 301*a* and the data selection circuit 302. The controller 301*a* generates a corresponding digital voltage signal according to the scanning end which needs to be applied with a scanning signal. The digital-analog converting circuit 301*b* converts the digital voltage signal into an analog voltage signal, which is the scanning signal needed by the electrodes of the scanning end.

According to other embodiments of the present disclosure, the control circuit can further comprise an external memory, in which a data list representing a corresponding relationship between each scanning end of the touch screen and the respective needed scanning signal is stored. In this case, the controller can directly obtain the scanning signal which needs to be applied to each scanning end through accessing the external memory and searching the data list. Therefore, the requirement for the performance of the controller can be reduced, the reliability of the whole driving circuit can be improved, and the cost thereof can be cut down.

The quality of the analog voltage signal generated by the digital-analog converting circuit is dependent on the reference voltage of the circuit and the digit of the digital-analog converter. The higher the quality of the reference voltage (i.e., the accuracy and stability of the reference voltage) is, the higher the accuracy and stability of the analog voltage signal generated by the digital-analog converting circuit would become. At the same time, the higher the digit of the digital-analog converter in the digital-analog converting circuit is, the higher the accuracy of the voltage signal generated by the digital-analog converting circuit would be. Therefore, according to the present embodiment, the control circuit further comprises a reference power circuit, which is connected with the digital-analog converting circuit and used for providing an accurate and stable reference voltage $V_{ref}$ to the digital-analog converting circuit. In addition, an 8-digit digital-analog converter is used in the digital-analog converting circuit, so that a more accurate scanning signal can be obtained. Of course, according to other embodiments of the present disclosure, the digital-analog converter with other reasonable digit (such as 4-digit or 12-digit) can be used as well, so that the needed analog voltage signal can be generated. The present disclosure is not limited by this.

According to the present embodiment, the control circuit 301 can generate an analog voltage signal, and thus the data selection circuit 302 that is connected with the control circuit 301 comprises an input end for data signal. The data selection circuit 302 comprises four output ends corresponding to the columns of the exciting electrode in the liquid crystal screen, i.e., the number of the scanning ends. The data selection circuit 302 can turn on or turn off a connection between an input end thereof and a corresponding output end according to the data selection signal from the controller 301a.

Specifically, according to the present embodiment, the data selection circuit 302 comprises an operational amplification circuit 302a and a controllable switch 302b. The operational amplification circuit 302a is connected between the digital-analog converting circuit 301b and the controllable switch 302b, and used for converting the analog voltage signal output by the digital-analog converting circuit 301b into an analog voltage signal that meets the requirement of the exciting electrodes in the touch screen.

The controllable switch 302b comprises an input end for data signal, an input end for control signal, and output ends. The input end for data signal is connected with the operational amplification circuit 302a, the input end for control signal is connected with the controller 301a, and the output ends each are connected with a corresponding scanning end of the touch screen. The controllable switch 302b can turn on or turn off a connection between the input end for data signal and an output end corresponding to the electrode to be driven (i.e., the electrode to be applied with a scanning signal) according to the data selection signal.

According to the present embodiment, the driving circuit uses FPGA to serve as the controllable switch. Since there are a lot of ends in the FPGA, the FPGA can be connected with a large number of scanning ends. Therefore, the driving circuit can meet the requirement of large sized touch screen. Moreover, the response speed of FPGA is high, so that FPGA can respond to the data selection signal sent by the controller 301a in a timely and fast manner.

It should be noted that, according to other embodiments of the present disclosure, the controllable switch can also be implemented with other reasonable circuits or elements, such as a single-pole multi-throw switch. The present disclosure is not limited by this. In addition, according to other embodiments of the present disclosure, if the scanning signal output by the control circuit can meet the requirement of the touch screen, the data selection circuit needs not to be provided with an operational amplification circuit, so that the volume and cost of the circuit can be saved.

The present disclosure further provides a touch screen comprising the aforesaid driving circuit for the touch screen and an electronic terminal comprising the touch screen.

It can be seen from the above description that, according to the present embodiment, in the driving circuit for the touch screen, the scanning ends of the touch screen are not provided with the same scanning signals. However, each scanning end is provided with different scanning signal according to the positional relationship between the scanning end and the test end. In the driving circuit, the influence on the following detection of the touch points generated by the attenuation of the scanning signal during transmission process can be reduced effectively, so that the reliability and accuracy of the detection result can be ensured. In addition, since in the driving circuit, the test ends output the same signal when the touch screen is not touched, the detection algorithm can be simplified and the efficiency of touch detection can be improved.

It could be understood that, the embodiments disclosed herein are not limited by the specific structures, treatment steps or materials disclosed herein, but incorporate the equivalent substitutes of these features which are comprehensible to those skilled in the art. It could be also understood that, the terms used herein are used for describing the specific embodiments, not for limiting them.

The phrases "one embodiment" or "embodiments" referred to herein mean that the descriptions of specific features, structures and characteristics in combination with the embodiments are included in at least one embodiment of the present disclosure. Therefore, the phrases "one embodiment" or "embodiments" appeared in different parts of the whole description do not necessarily refer to the same embodiment.

For the purpose of convenience, a plurality of items, structural units and/or component units used herein can be listed in a common list. However, the list shall be understood in a way that each element thereof represents an only and unique member. Therefore, when there is no other explanation, none of members of the list can be understood as an actual equivalent of other members in the same list only based on the fact that they appear in the same list. In addition, the embodiments and examples of the present disclosure can be explained with reference to the substitutes of each of the components. It could be understood that, the embodiments, examples and substitutes herein shall not be interpreted as the equivalents of one another, but shall be considered as separate and independent representatives of the present disclosure.

The embodiments are described hereinabove to interpret the principles of the present disclosure in one application or a plurality of applications. However, a person skilled in the art, without departing from the principles and thoughts of the present disclosure, can make various modifications to the forms, usages and details of the embodiments of the present disclosure without any creative work. Therefore, the protection scope of the present disclosure shall be determined by the claims.

The invention claimed is:

1. A driving circuit for a touch screen, comprising:
a control circuit, used for generating and outputting a scanning signal and a data selection signal according to a position of an electrode to be driven; and a data selection circuit, an input end thereof being connected with said control circuit, output ends thereof each being connected with a corresponding scanning end of the touch screen, wherein the data selection circuit is configured to turn on or turn off a connection between an input end thereof and an output end corresponding to the electrode to be driven according to said data selection signal, so as to drive said electrode to be driven through said scanning signal, wherein said control circuit comprises:

a controller, used for generating and outputting a corresponding digital voltage signal and the data selection signal according to the position of the electrode to be driven; and a digital-analog converting circuit, connected with said controller, and used for converting a digital voltage signal output by said controller into an analog voltage signal so as to obtain the scanning signal, wherein said data selection circuit comprises:

a controllable switch, an input end for data signal thereof being connected with said digital-analog converting circuit, an input end for control signal thereof being connected with said controller, output ends thereof each being connected with a corresponding scanning end of the touch screen, wherein the controllable switch is used for turning on or turning off a connection between the input end for data signal and an output end corresponding to the electrode column to be driven according to said data selection signal.

2. The driving circuit according to claim 1, wherein the larger the distance between said electrode to be driven and a test end of a liquid crystal screen is, the larger the value of the scanning signal output by said control circuit would become.

3. The driving circuit according to claim 1, wherein said control circuit further comprises:

a reference power circuit, connected with said digital-analog converting circuit and used for providing a reference voltage to said digital-analog converting circuit.

4. The driving circuit according to claim 1, wherein said data selection circuit further comprises:

an operational amplification circuit, connected between said digital-analog converting circuit and said controllable switch, and used for outputting the scanning signal to said controllable switch after operational amplification.

5. The driving circuit according to claim 1, wherein said controllable switch comprises a Field Programmable Gate Array (FPGA).

6. The driving circuit according to claim 1, wherein said controllable switch comprises a single-pole multi-throw switch.

7. A touch screen, comprising a driving circuit for the touch screen, wherein said driving circuit for the touch screen comprises:

a control circuit, used for generating and outputting a scanning signal and a data selection signal according to a position of an electrode to be driven; and a data selection circuit, an input end thereof being connected with said control circuit, output ends thereof each being connected with a corresponding scanning end of the touch screen, wherein the data selection circuit is configured to turn on or turn off a connection between an input end thereof and an output end corresponding to the electrode to be driven according to said data selection signal, so as to drive said electrode to be driven through said scanning signal, wherein said control circuit comprises:

a controller, used for generating and outputting a corresponding digital voltage signal and the data selection signal according to the position of the electrode to be driven; and a digital-analog converting circuit, connected with said controller, and used for converting a digital voltage signal output by said controller into an analog voltage signal so as to obtain the scanning signal, wherein said data selection circuit comprises:

a controllable switch, an input end for data signal thereof being connected with said digital-analog converting circuit, an input end for control signal thereof being connected with said controller, output ends thereof each being connected with a corresponding scanning end of the touch screen, wherein the controllable switch is used for turning on or turning off a connection between the input end for data signal and an output end corresponding to the electrode column to be driven according to said data selection signal.

8. The touch screen according to claim 7, wherein the larger the distance between said electrode to be driven and a test end of a liquid crystal screen is, the larger the value of the scanning signal output by said control circuit would become.

9. The touch screen according to claim 7, wherein said control circuit further comprises:

a reference power circuit, connected with said digital-analog converting circuit and used for providing a reference voltage to said digital-analog converting circuit.

10. The touch screen according to claim 7, wherein said data selection circuit further comprises:

an operational amplification circuit, connected between said digital-analog converting circuit and said controllable switch, and used for outputting the scanning signal to said controllable switch after operational amplification.

11. The touch screen according to claim 7, wherein said controllable switch comprises a Field Programmable Gate Array (FPGA).

12. The touch screen according to claim 7, wherein said controllable switch comprises a single-pole multi-throw switch.

13. An electronic terminal, comprising a touch screen, wherein said touch screen comprises a driving circuit for the touch screen, which comprises:

a control circuit, used for generating and outputting a scanning signal and a data selection signal according to a position of an electrode to be driven; and a data selection circuit, an input end thereof being connected with said control circuit, output ends thereof each being connected with a corresponding scanning end of the touch screen, wherein the data selection circuit is used for turning on or turning off a connection between an input end thereof and an output end corresponding to the electrode to be driven according to said data selection signal, so as to drive said electrode to be driven taking advantage of said scanning signal, wherein said control circuit comprises:

a controller, used for generating and outputting, a corresponding digital voltage signal and the data selection signal according to the position of the electrode to be driven; and a digital-analog converting circuit, connected with said controller, and used for converting a digital voltage signal output by said controller into an analog voltage signal so as to obtain the scanning signal, wherein said data selection circuit comprises:

a controllable switch, an input end for data signal thereof being connected with said digital-analog converting circuit, an input end for control signal thereof being connected with said controller, output ends thereof each being connected with a corresponding scanning end of the touch screen, wherein the controllable switch is used for turning on or turning off a connection between the input end for data signal and an output end corresponding to the electrode column to be driven according to said data selection signal.

* * * * *